US012141945B2

United States Patent
Cai et al.

(10) Patent No.: US 12,141,945 B2
(45) Date of Patent: Nov. 12, 2024

(54) TECHNIQUES FOR ROBUST IMAGE DENOISING

(71) Applicants: DISNEY ENTERPRISES, INC., Burbank, CA (US); ETH Zürich (Eidgenössische Technische Hochschule Zürich), Zürich (CH)

(72) Inventors: Zhilin Cai, Zurich (CH); Tunc Ozan Aydin, Zurich (CH); Marco Manzi, Zurich (CH); Ahmet Cengiz Oztireli, Zurich (CH)

(73) Assignees: Disney Enterprises, INC., Burbank, CA (US); ETH Zürich (Eidgenössische Technische Hochschule Zürich), Zurich (CH)

(*) Notice: Subject to any disclaimer, the term of this patent is extended or adjusted under 35 U.S.C. 154(b) by 542 days.

(21) Appl. No.: 16/795,486

(22) Filed: Feb. 19, 2020

(65) Prior Publication Data

US 2021/0150674 A1 May 20, 2021

Related U.S. Application Data

(60) Provisional application No. 62/936,341, filed on Nov. 15, 2019.

(51) Int. Cl.
*G06T 5/70* (2024.01)
*G06T 5/50* (2006.01)

(52) U.S. Cl.
CPC .......... *G06T 5/70* (2024.01); *G06T 5/50* (2013.01); *G06T 2207/20081* (2013.01); *G06T 2207/20084* (2013.01); *G06T 2207/20221* (2013.01)

(58) Field of Classification Search
CPC ........... G06T 5/00; G06T 5/001; G06T 5/002; G06T 5/005; G06T 5/50;
(Continued)

(56) References Cited

U.S. PATENT DOCUMENTS

2012/0250995 A1* 10/2012 Matsumoto ............... G06T 5/20
382/167
2014/0347526 A1* 11/2014 Hara .................... H04N 5/2173
348/241
(Continued)

OTHER PUBLICATIONS

Abdelhamed et al., "A High-Quality Denoising Dataset for Smartphone Cameras", In IEEE Conference on Computer Vision and Pattern Recognition (CVPR), DOI 10.1109/CVPR.2018.00182, Jun. 2018, pp. 1692-1700.
(Continued)

*Primary Examiner* — Leon Viet Q Nguyen
(74) *Attorney, Agent, or Firm* — Squire Patton Boggs LLP; Sarah Mirza

(57) ABSTRACT

Techniques are disclosed for training and applying a denoising model. The denoising model includes multiple specialized denoisers and a generalizer, each of which is a machine learning model. The specialized denoisers are trained to denoise images associated with specific ranges of noise parameters. The generalizer is trained to generate per-pixel denoising kernels for denoising images associated with arbitrary noise parameters using outputs of the specialized denoisers. Subsequent to training, a noisy image, such as a live-action image or a rendered image, can be denoised by inputting the noisy image into the specialized denoisers to obtain intermediate denoised images that are then input, along with the noisy image, into the generalizer to obtain per-pixel denoising kernels, which can be normalized and applied to denoise the noisy image.

17 Claims, 9 Drawing Sheets

(58) Field of Classification Search
CPC . G06T 2207/20081; G06T 2207/20084; G06T 2207/20212; G06T 2207/20216; G06T 2207/20221; G06T 2207/20224
USPC .................. 382/155–158, 275, 254, 279, 309
See application file for complete search history.

(56) References Cited

U.S. PATENT DOCUMENTS

| | | | |
|---|---|---|---|
| 2015/0287171 A1* | 10/2015 | Hiasa | G06T 5/20 382/195 |
| 2016/0171727 A1* | 6/2016 | Bouchard | G06T 5/60 382/131 |
| 2018/0240219 A1* | 8/2018 | Mentl | G06T 11/008 |
| 2019/0304068 A1* | 10/2019 | Vogels | G06T 5/60 |
| 2020/0311981 A1* | 10/2020 | Hiasa | H04N 23/741 |
| 2020/0364834 A1* | 11/2020 | Ferrés | G06T 5/60 |

OTHER PUBLICATIONS

Aharon et al., "K-SVD: An Algorithm for Designing Overcomplete Dictionaries for Sparse Representation", IEEE Transactions on Signal Processing, vol. 54, No. 11, Nov. 2006, pp. 4311-4322.

Bako et al., "Kernel-Predicting Convolutional Networks for Denoising Monte Carlo Renderings", DOI: http://dx.doi.org/10.1145/3072959.3073708, ACM Transactions on Graphics, vol. 36, No. 4, Article 97, Jul. 2017, pp. 97:1-97:14.

Brooks et al., "Unprocessing Images for Learned Raw Denoising", In IEEE Conference on Computer Vision and Pattern Recognition (CVPR), DOI 10.1109/CVPR.2019.01129, 2019, pp. 11028-11037.

Buades et al., "A non-local algorithm for image denoising", In 2005 IEEE Computer Society Conference on Computer Vision and Pattern Recognition (CVPR'05), vol. 2, Jun. 2005, pp. 60-65.

Burger et al., "Image denoising: Can plain Neural Networks compete with BM3D?", In 2012 IEEE Conference on Computer Vision and Pattern Recognition, Jun. 2012, pp. 2392-2399.

Chen et al., "Trainable Nonlinear Reaction Diffusion: A Flexible Framework for Fast and Effective Image Restoration", IEEE Transactions on Pattern Analysis and Machine Intelligence, https://doi.org/10.1109/TPAMI.2016.2596743, vol. 39, No. 6, Jun. 2017, pp. 1256-1272.

Dabov et al., "Image Denoising by Sparse 3-D Transform-Domain Collaborative Filtering", Digital Object Identifier 10.1109/TIP.2007.901238, IEEE Transactions on Image Processing, vol. 16, No. 8, Aug. 2007, pp. 2080-2095.

Ehret et al., "Model-blind Video Denoising Via Frame-to-frame Training", In IEEE Conference on Computer Vision and Pattern Recognition (CVPR), Jun. 2019, pp. 11369-11378.

Elad et al., "Image Denoising Via Sparse and Redundant Representations Over Learned Dictionaries", IEEE Transactions on Image Processing, vol. 15, No. 12, Dec. 2006, pp. 3736-3745.

Gu et al., "Weighted Nuclear Norm Minimization with Application to Image Denoising", In IEEE Conference on Computer Vision and Pattern Recognition, DOI 10.1109/CVPR.2014.366, Jun. 2014, pp. 2862-2869.

Guo et al., "Toward Convolutional Blind Denoising of Real Photographs", In IEEE Conference on Computer Vision and Pattern Recognition (CVPR), 2019, pp. 1712-1722.

Keller et al., "The Path Tracing Revolution in the Movie Industry", In ACMSIGGRAPH 2015 Courses, SIGGRAPH 15, Aug. 9-13, 2015, pp. 1-7.

Laine et al., "High-Quality Self-Supervised Deep Image Denoising", 33rd Conference on Neural Information Processing Systems (NeurIPS 2019), 2019, pp. 1-11.

Lehtinen et al., "Noise2Noise: Learning Image Restoration without Clean Data", In 2018 International Conference on Machine Learning (ICML), arXiv:1803.04189, 2018, 12 pages.

Mildenhall et al., "Burst Denoising with Kernel Prediction Networks", CVPR, 2018, pp. 2502-2510.

Plotz et al., "Benchmarking Denoising Algorithms with Real Photographs", In IEEE Conference on Computer Vision and Pattern Recognition (CVPR), 2017, pp. 1586-1595.

Ronneberger et al., "U-Net: Convolutional Networks for Biomedical Image Segmentation", In MICCAI, DOI: 10.1007/978-3-319-24574-4_28, 2015, pp. 234-241.

Roth et al., "Fields of Experts", IJCV, DOI 10.1007/s11263-008-0197-6, vol. 82, No. 2, 2009, pp. 205-229.

Talebi et al., "Global Image Denoising", IEEE TIP, DOI 10.1109/TIP.2013.2293425, vol. 23, No. 2, Feb. 2014, pp. 755-768.

Vogels et al., "Denoising with Kernel Prediction and Asymmetric Loss Functions", ACM Transactions on Graphics, https://doi.org/10.1145/3197517.3201388, vol. 37, No. 4, Article 124, Aug. 2018, pp. 124:1-124:15.

Zamir et al., "Taskonomy: Disentangling Task Transfer Learning", In IEEE Conference on Computer Vision and Pattern Recognition (CVPR), 2018, pp. 3712-3722.

Zhang et al., "Beyond a Gaussian Denoiser: Residual Learning of Deep CNN for Image Denoising", In IEEE Transactions on Image Processing, DOI 10.1109/TIP.2017.2662206, vol. 26, No. 7, Jul. 2017, pp. 3142-3155.

Zhang et al., "Two-stage image denoising by principal component analysis with local pixel grouping", In Pattern Recognition, doi:10.1016/j.patcog.2009.09.023, vol. 43, 2010, pp. 1531-1549.

Zoran et al., "From Learning Models of Natural Image Patches to Whole Image Restoration", In 2011 International Conference on Computer Vision, Nov. 2011, pp. 479-486.

Swicker et al., "Recent Advances in Adaptive Sampling and Reconstruction for Monte Carlo Rendering", Computer Graphics Forum (Proceedings of Eurographics—State of the Art Reports), vol. 34, No. 2, May 2015, 15 pages.

Thijs Vogels et al., "Denoising with Kernel Prediction and Asymmetric Loss Functions", ACM Transactions on Graphics, vol. 37, No. 4, Aug. 10, 2018, 15 pages.

Talmaj Marinc et al., "Multi-Kernel Prediction Networks For Denoising of Burst Images", Feb. 5, 2019, 5 pages.

Extended European Search Report issued for corresponding European Application Serial No. 20207423.3 dated Mar. 29, 2021, 8 pages.

\* cited by examiner

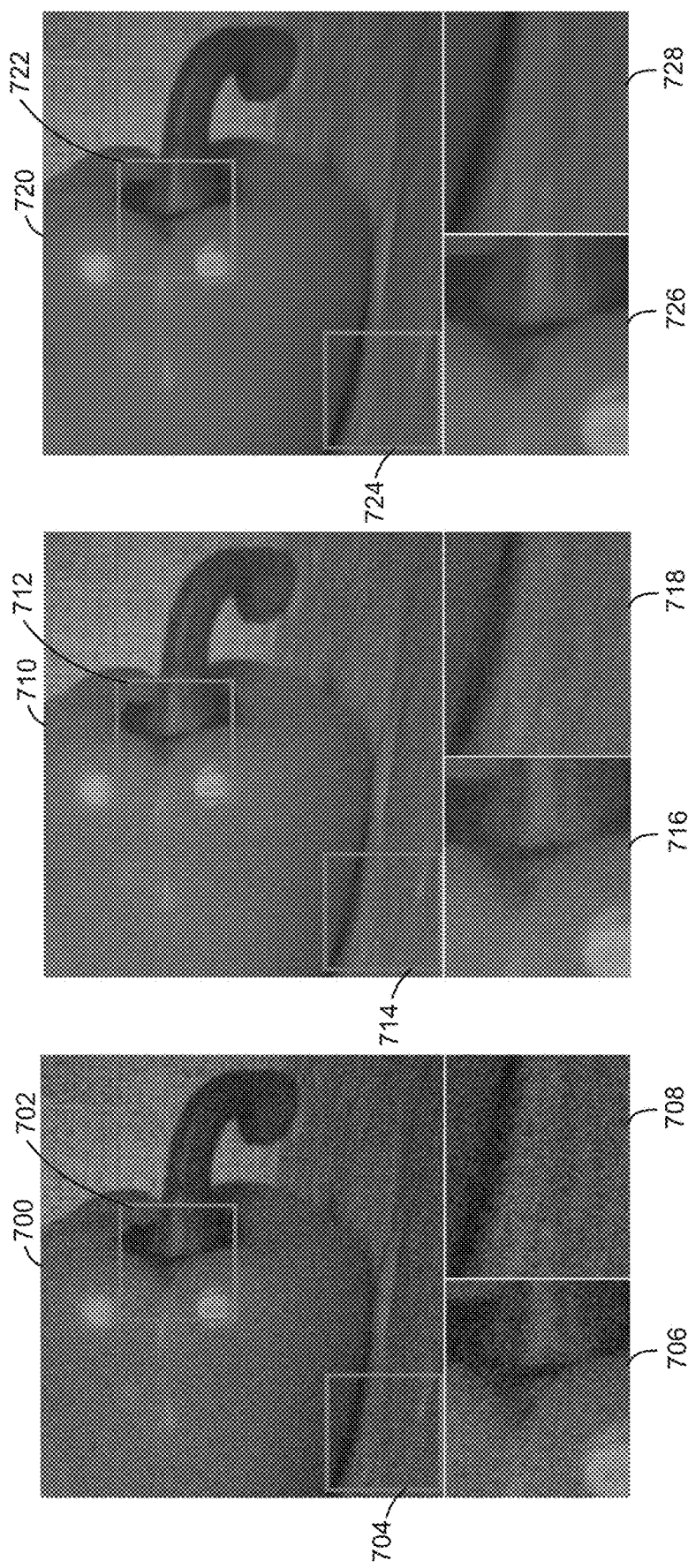

TECHNIQUES FOR ROBUST IMAGE DENOISING

CROSS-REFERENCE TO RELATED APPLICATIONS

This application claims priority benefit of the United States Provisional Patent Application titled, "ROBUST IMAGE DENOISING USING KERNEL PREDICTING NETWORKS," filed on Nov. 15, 2019 and having Ser. No. 62/936,341. The subject matter of this related application is hereby incorporated herein by reference.

BACKGROUND

Technical Field

Embodiments of the present disclosure relate generally to image processing and denoising and, more specifically, to techniques for robust image denoising.

Description of the Related Art

Image noise refers to random variation in the color and/or brightness within images. Noise is a typical byproduct in images that are rendered using Monte Carlo rendering techniques. Images (i.e., photographs) captured by cameras can also contain noise due to the mechanics of camera sensors. For example, the quality of images captured in low-lighting conditions can be adversely affected by noise.

Image denoising is the process of removing noise from an image. Conventional approaches for image denoising utilize either specialized denoisers or "blind" denoisers. Specialized denoisers, such as deep denoising networks, can be trained to remove specific types of noise from images, where the noise is typically within narrow ranges of one or more noise parameters, such as additive white Gaussian noise having a certain magnitude. However, the performance of specialized denoisers drops rapidly for images having noise with noise parameters that are different than the training noise parameters.

In contrast to specialized denoisers, blind denoisers are typically trained using images having noise with diverse noise parameters. Although blind denoisers can be robust to different noise parameters, such robustness comes at the cost of overall denoising quality. In particular, the denoising quality of blind denoisers is generally lower than specialized denoisers for images having noise with the particular noise parameters that the specialized denoisers were trained to denoise.

Currently, there are few, if any, denoising techniques that optimally balance or combine the denoising quality of specialized denoisers with the denoising robustness of blind denoisers.

As the foregoing illustrates, what is needed in the art are more effective techniques for denoising images.

SUMMARY

One embodiment of the present application sets forth a computer-implemented method for denoising an image. The method includes processing the image using a plurality of first denoisers to generate a plurality of first denoised images, where each first denoiser is trained to denoise images associated with at least one noise parameter. The method further includes processing the image and the plurality of first denoised images using a second denoiser to generate a second denoised image.

Another embodiment of the present application sets forth a computer-implemented method for training denoisers. The method includes training each first denoiser included in a plurality of first denoisers using a respective set of images associated with at least one noise parameter and ground truth images corresponding to images included in the respective set of images. The method further includes training a second denoiser using an additional set of images, ground truth images corresponding to images included in the additional set of images, and a plurality of denoised images, where the plurality of denoised images is generated by processing the additional set of images using the plurality of first denoisers.

Other embodiments of the present disclosure include, without limitation, a computer-readable medium including instructions for performing one or more aspects of the disclosed techniques as well as a computing device for performing one or more aspects of the disclosed techniques.

At least one technical advantage of the disclosed techniques relative to the prior art is that the disclosed techniques bypass the traditional tradeoff between the denoising quality of specialized denoisers and the generalizability and robustness of blind denoisers. In that regard, the disclosed techniques combine the performance of specialized denoisers with the generalizing capabilities of blind denoisers. Experience has shown that the disclosed techniques can achieve better denoising quality than conventional specialized denoisers when applied to images having noise with arbitrary noise parameters, such as different noise magnitudes. The disclosed techniques also can achieve better overall denoising quality than conventional blind denoisers. In addition, the disclosed techniques can denoise images more quickly than many conventional denoisers. These technical advantages represent one or more technological improvements over prior art approaches.

BRIEF DESCRIPTION OF THE DRAWINGS

So that the manner in which the above recited features of the disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIG. 7A illustrates another exemplar noisy image;

FIG. 7B illustrates a denoised image generated using a conventional specialized denoiser, according to the prior art;

FIG. 7C illustrates a denoised image generated using the specialized denoisers and the generalizer of FIG. 1, according to various embodiments;

DETAILED DESCRIPTION

In the following description, numerous specific details are set forth to provide a more thorough understanding of the present invention. However, it will be apparent to one of skill in the art that embodiments of the present invention may be practiced without one or more of these specific details.

System Overview

Figure 1:
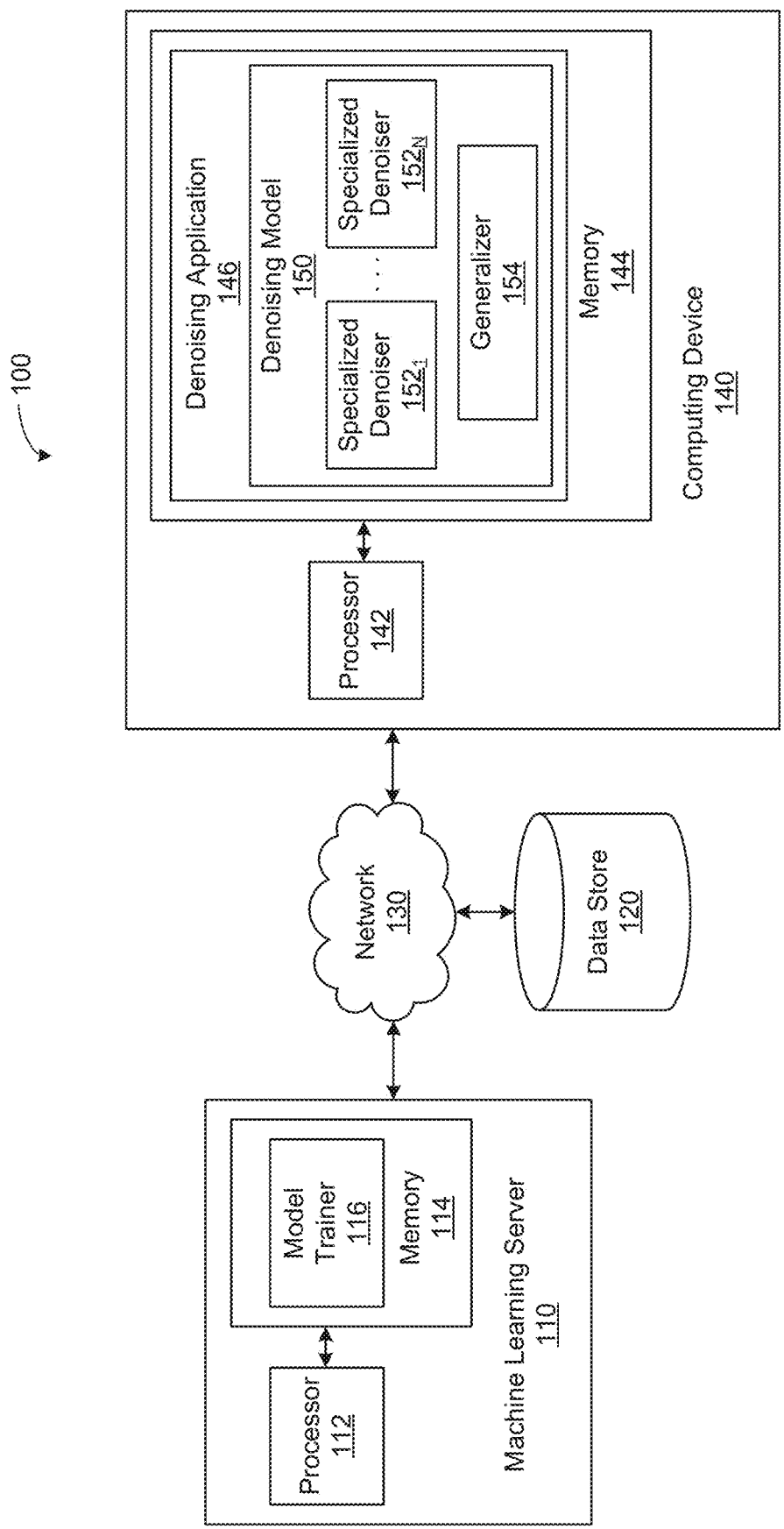
FIG. 1 illustrates a system configured to implement one or more aspects of the various embodiments.

FIG. 1 illustrates a system 100 configured to implement one or more aspects of the various embodiments. As shown, the system 100 includes a machine learning server 110, a data store 120, and a computing device 140 in communication over a network 130, which may be a wide area network (WAN) such as the Internet, a local area network (LAN), or any other suitable network.

As shown, a model trainer 116 executes on a processor 112 of the machine learning server 110 and is stored in a system memory 114 of the machine learning server 110. The processor 112 receives user input from input devices, such as a keyboard or a mouse. In operation, the processor 112 is the master processor of the machine learning server 110, controlling and coordinating operations of other system components. In particular, the processor 112 may issue commands that control the operation of a graphics processing unit (GPU) that incorporates circuitry optimized for graphics and video processing, including, for example, video output circuitry. The GPU may deliver pixels to a display device that may be any conventional cathode ray tube, liquid crystal display, light-emitting diode display, or the like.

The system memory 114 of the machine learning server 110 stores content, such as software applications and data, for use by the processor 112 and the GPU. The system memory 114 may be any type of memory capable of storing data and software applications, such as a random access memory (RAM), a read-only memory (ROM), an erasable programmable read-only memory (EPROM or Flash ROM), or any suitable combination of the foregoing. In some embodiments, a storage (not shown) may supplement or replace the system memory 114. The storage may include any number and type of external memories that are accessible to the processor 112 and/or the GPU. For example, and without limitation, the storage may include a Secure Digital Card, an external Flash memory, a portable compact disc read-only memory (CD-ROM), an optical storage device, a magnetic storage device, or any suitable combination of the foregoing.

It will be appreciated that the machine learning server 110 shown herein is illustrative and that variations and modifications are possible. For example, the number of processors 112, the number of GPUs, the number of system memories 114, and the number of applications included in the system memory 114 may be modified as desired. Further, the connection topology between the various units in FIG. 1 may be modified as desired. In some embodiments, any combination of the processor 112, the system memory 114, and a GPU may be replaced with any type of virtual computing system, distributed computing system, or cloud computing environment, such as a public, private, or a hybrid cloud.

As discussed in greater detail below, the model trainer 116 is configured to train machine learning models, including multiple specialized denoisers $152_{1-N}$, which are individually referred to as a specialized denoiser 152 and collectively referred to as specialized denoisers 152, and a generalizer 154. Each of the specialized denoisers 152 is trained to denoise images associated with specific ranges of noise parameters (i.e., images having noise with noise parameters that are within the specific ranges). For example, the specific ranges of noise parameters could indicate a particular type of camera sensor or a particular range of Gaussian noise magnitudes. By contrast, the generalizer 154 is trained to generate per-pixel kernels (i.e., individual kernels for each pixel) for denoising images associated with arbitrary noise parameters, as opposed to specific ranges of noise parameters. As described in greater detail below, the generalizer 154 receives as input an image to be denoised as well intermediate denoised images generated by the specialized denoisers 152 after the same image is input into the specialized denoisers 152. Denoised images output by the specialized denoisers 152 are referred to herein as intermediate denoised images to distinguish them from the denoised images output by an overall denoising model 150 that includes both the specialized denoisers 152 and the generalizer 154, discussed in greater detail below. The generalizer 154 is an example of a second denoiser (with the specialized denoisers 152 being the first denoisers) that can be trained and applied to denoise images given the images themselves, as well intermediate denoised images output by the specialized denoisers 152, as input. Any technically feasible second denoiser may be used in other embodiments. For example, the second denoiser may generate outputs other than denoising kernels, such as denoised images, in some embodiments.

The architectures of the specialized denoisers 152 and the generalizer 154, as well as techniques for training the same, are discussed in greater detail below. Training data and/or trained machine learning models, including the specialized denoisers 152 and the generalizer 154, may be stored in the data store 120. In some embodiments, the data store 120 may include any storage device or devices, such as fixed disc drive(s), flash drive(s), optical storage, network attached storage (NAS), and/or a storage area-network (SAN). Although shown as accessible over the network 130, in some embodiments the machine learning server 110 may include the data store 120.

The trained specialized denoisers 152 and generalizer 154 may be deployed to any suitable applications that denoise images. Illustratively, a denoising application 146 is stored in a memory 144, and executes on a processor 142 of the computing device 140. Components of the computing device 140, including the memory 144 and the processor 142 may be similar to corresponding components of the machine learning server 110.

As shown, the denoising application 146 includes the denoising model 150, which itself includes the specialized denoisers 152 and the generalizer 154. As described, each of the specialized denoisers 152 is a machine learning model trained to denoise images associated with a specific range of noise parameters. In some embodiments, the specialized denoisers 152 may be denoising convolutional neural networks (DnCNNs), discussed in greater detail below. In alternative embodiments, the specialized denoisers 152 may be other types of denoisers, such as U-net architecture networks. Any number and type of specialized denoisers 152 may be employed in embodiments. For example, three specialized denoisers may be used in some embodiments. In general, if the parameter space of the noise is more complex, then more specialized denoisers may be used, and vice versa if the parameter space of the noise is simpler. It should be noted that there is a trade-off between denoising performance and the number of specialized denoisers 152, as adding specialized denoisers 152 generally increases computational costs.

As described, the generalizer 154 is trained to generate per-pixel denoising kernels for denoising images having noise with arbitrary noise parameters. The generalizer 154 takes as input noisy images, as well as intermediate denoised images generated by the specialized denoisers 152, which are input into the generalizer 154 as additional features and also referred to herein as "denoised-image features." The noisy image may generally be any image that a user wishes to denoise. Examples of such images include live-action images captured by a camera and images rendered via Monte Carlo rendering techniques. For example, a live-action image could be denoised before visual effects are added. As another example, denoising could be applied to a high dynamic range image, which can include a relatively large amount of noise. As yet another example, denoising could be used to accelerate rendering by denoising an initial noisy image generated via Monte Carlo rendering.

In some embodiments, the generalizer 154 is a kernel-generating machine learning model, such as a kernel predicting convolutional network (KPCN). As discussed in greater detail below in conjunction with FIGS. 2 and 9, the denoising application 146 can denoise a noisy image by first processing the noisy image using the specialized denoisers 152 to generate intermediate denoised images. Then, the denoising application 146 inputs the intermediate denoised images generated by the specialized denoisers 152 as features, in addition to the noisy image, into the generalizer 154. In turn, the generalizer 154 outputs per-pixel denoising kernels, which the denoising application 146 normalizes and applies to the noisy image to generate a denoised image.

In some embodiments, discussed in greater detail below in conjunction with FIGS. 4 and 9, multi-scale denoising may be performed to more effectively remove low-frequency components of noise. In such cases, a noisy image is downsampled one or more times to different scales prior to being input into the denoising model 150 that includes the specialized denoisers 152 and the generalizer 154. Then, the denoised outputs of the denoising model 150 at the different scales are combined to generate a final denoised image. This is in contrast to simply processing the noisy image using the specialized denoisers 152 and then inputting the noisy image and the intermediate denoised images generated by the specialized denoisers 152 into the generalizer 154, as described above.

Experience has shown that the denoising model 150 can achieve better denoising quality than conventional specialized denoisers. The denoising model 150 can also generalize better than conventional blind denoisers. In addition, the denoising model 150 can denoise images more quickly than some conventional denoisers. It should also be noted that the denoising model 150 does not require noise parameters to be explicitly estimated or a camera imaging pipeline to be modeled.

The number of machine learning servers and application servers may be modified as desired. Further, the functionality included in any of the applications may be divided across any number of applications or other software that are stored and execute via any number of devices that are located in any number of physical locations.

Robust Image Denoising

Figure 2:
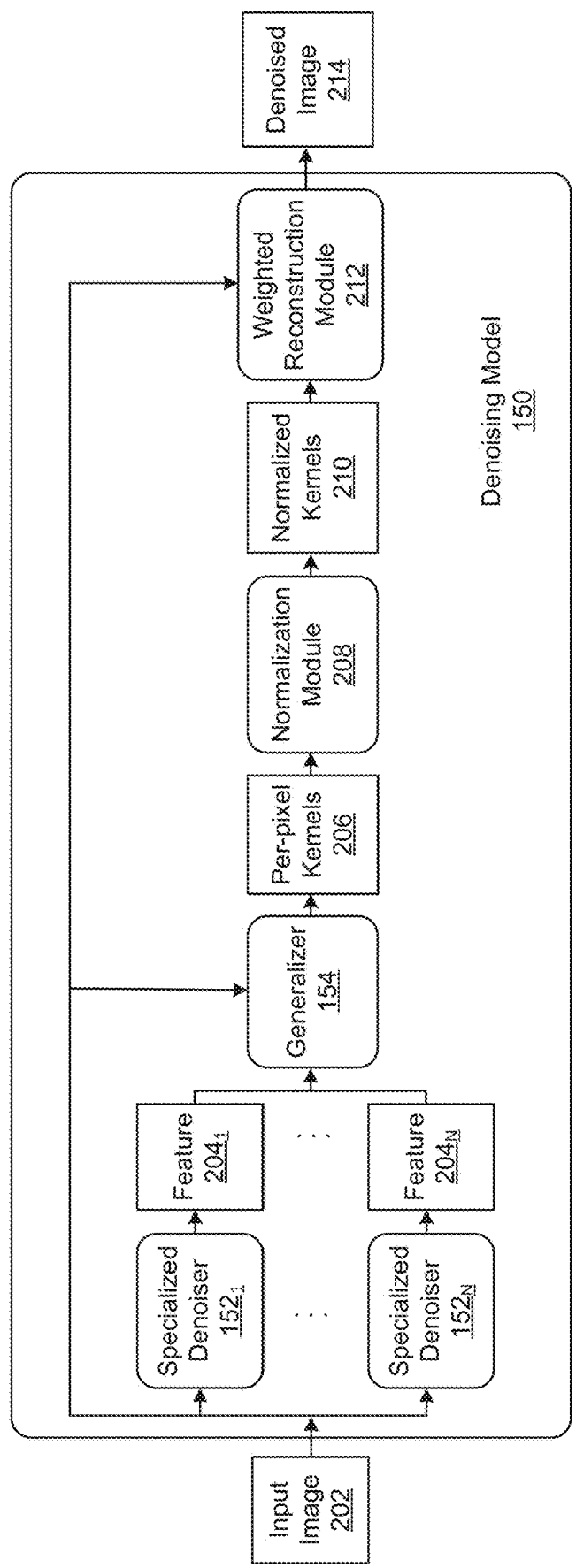
FIG. 2 is a more detailed illustration of the denoising model of FIG. 1, according to various embodiments.

FIG. 2 is a more detailed illustration of the demising model 150 of FIG. 1, according to various embodiments. In FIGS. 2 and 4-5, rectangles with rounded edges represent software components and rectangles with square edges represent data, which may be input into and/or output from the software components.

As shown, the denoising model 150 is used by the denoising application 146 to process a noisy image 202 and obtain a denoised image 214. As described, the noisy image 202 may be, e.g., a live-action image captured by a camera or a rendered image. Although described herein primarily with respect to receiving and denoising a single image at a time, in some embodiments, the denoising application 146 may process multiple image frames from a video at once, such as a number of consecutive image frames before and after a given image frame that is being denoised. Doing so allows the denoising application 146 to consider temporal neighborhoods as well as spatial neighborhoods of each pixel.

The denoising application 146 first inputs the noisy image 202 into the specialized denoisers 152. As described, the specialized denoisers 152 output intermediate denoised images that are input as additional features $204_{1-N}$, along with the noisy image 202, into a second denoiser, which as shown is the generalizer 154. Each of the features $204_{1-N}$ represents characteristics of the noisy image 202, namely an intermediate denoised version of the noisy image 202, that is input into the generalizer 154. The features $204_{1-N}$ are referred to herein individually as a feature 204 and collectively as features 204. As the features 204 include denoised images, the features 240 are also referred to herein as "denoised-image features." Although described herein with respect to denoised-image features for simplicity, some embodiments may actually employ three channels, namely the red, green, and blue channels, for each of the denoised-image features as well as for the noisy image.

As described, each of the specialized denoisers 152 is trained to demise images associated with a specific range of noise parameters. The noise parameters could indicate, e.g., a particular type of camera sensor or a particular range of Gaussian noise magnitudes. In some embodiments, each of the specialized denoisers 152 is a DnCNN. The DnCNN architecture includes blocks of convolutional layers (including, e.g., 3×3 filters and 64 channels) followed by batch normalization and rectified linear unit (Real) activations, as well as a final layer (e.g., a 3×3 layer) that produces an output. In alternative embodiments, the specialized denoisers 152 may be other types of denoisers, such as U-net architecture networks.

More formally, each of the specialized denoisers 152 can be trained using noisy images having noise with a specific set of noise parameters $\{\lambda_0, \lambda_1, \ldots, \lambda_s\}$. Subsequent to training, the specialized denoisers 152 may generally perform well in denoising images associated with noise parameters similar to those used to train the specialized denoisers 152. However, the denoising performance of the specialized denoisers 152 drops rapidly for images having noise with different noise parameters.

To alleviate the inability of the specialized denoisers 152 to generalize over noise parameters, the denoising application 146 further processes the noisy image 202 using the generalizer 154, The generalizer 154 receives as inputs the noisy image 202 and intermediate denoised images, which are output by the specialized denoisers 152 and input as the features 204 into the generalizer 154. As shown, the generalizer 154 outputs per-pixel denoising kernels 206, which are individually referred to as a denoising kernel 206 and collectively referred to as per-pixel denoising kernels 206. In some embodiments, the generalizer 154 may be a KPCN. For computational efficiency reasons, the number of denoised image features will generally be low, and the noise parameters associated with an image $\lambda_a$ may not match the noise parameters $\{\lambda_0, \lambda_1, \ldots, \lambda_s\}$ that the specialized denoisers 152 were trained on. The generalizer 154 is therefore used to estimate suitable per-pixel denoising kernels 206 for the noisy image 202 associated with noise parameters $\lambda_a$ of any input image given the image itself and denoised-image features output by the specialized denoisers 152. Doing so produces a relatively consistent denoising quality over a wide range of noise parameters, making the denoising model 150 robust to image noise characteristics.

If the input noisy image 202 is treated as a vector, which can be denoted as $x \in \mathbb{R}^3$, then the denoised-image features are additional channels f, each of which includes an individual feature map $\{f_1, f_2, \ldots, f_s\}$. The generalizer 154 takes as input the tuple $\{x, f\}$. The generalizer 154 is trained to minimize an average distance between estimated denoised images $\hat{x}$ and corresponding noise-free ground truth images y in a training data set. The noise-free ground truth images in the training data set are also referred to herein as "clean" images and may be images to which noise (e.g., Gaussian noise) has been applied to generate noisy images. It should be understood that the training data may generally include such noisy images as well as the corresponding clean images. More formally, the generalizer 154 may be expressed as $\hat{x} = (d\{x, f\}; \hat{\theta})$, where d denotes a denoiser with parameters $\hat{\theta}$. During training, the parameters $\hat{\theta}$ are determined in a supervised setting using the dataset $\{\{x^1, y^1\}, \{x^2, y^2\}, \ldots, \{x^n, y^n\}\}$, with the objective, or loss function, being:

$$\hat{\theta} = \underset{\theta}{\mathrm{argmin}} \frac{1}{N} \sum_{n=1}^{N} l(y, d(\{x, f\}; \theta)). \quad (1)$$

The trained generalizer 154 can be used to estimate a k×k kernel of scalar weights around the neighborhood $\mathcal{N}(p)$ of a pixel location p, which is also referred to herein as the denoising kernel 206 for the pixel location p. The denoising application 146 may then use such a denoising kernel 206 to compute a weighted linear combination of the pixels in the neighborhood $\mathcal{N}(p)$ to obtain the final pixel color prediction at the pixel location p. As shown, a normalization module 208 of the denoising application 146 then normalizes each of the per-pixel denoising kernels 206 to generate normalized kernels 210, after which a weighted reconstruction module 212 of the denoising application 212 applies the normalized kernels 210 to denoise the noisy image 202 via weighted reconstruction. In some embodiments, the denoising application 146 normalizes weights of the per-pixel denoising kernels 206 using a softmax function so that the weights have values within [0,1]. The denoised image 214 is then output from the denoising model 150.

As described, the generalizer 154 is a KPCN in some embodiments. The KPCN architecture includes residual blocks, each of which can include 3×3 convolution layers bypassed by a skip connection. As described, rather than directly predicting pixel colors, KPCNs predict per-pixel denoising kernels, which can provide significant improvement in convergence speed during training. For example, the KPCN could output a 5×5 denoising kernel for each pixel. In some embodiments, the KPCN generalizer 154 estimates a denoising kernel at pixel location p using the following identity:

$$\hat{x}_p = d_p(\{x, f\}; \hat{\theta}) = \sum_{q \in \mathcal{N}(p)} w_{pq} x_q, \quad (2)$$

where $w_{pq}$ denotes a normalized estimated weight at location q belonging to the kernel at pixel location p.

Figure 3A:
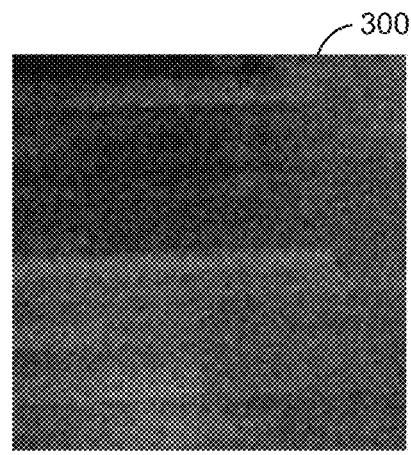
FIG. 3A illustrates an exemplar noisy image.
Figure 3B:
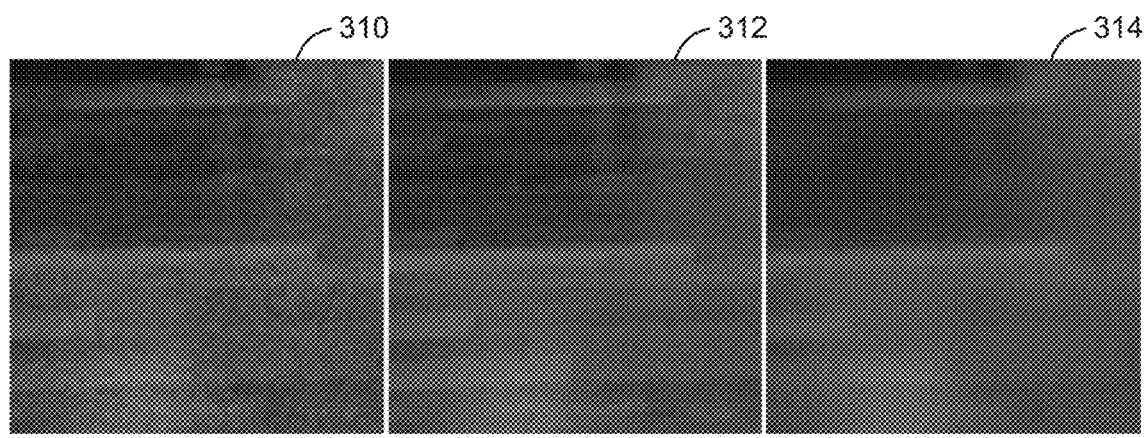
FIG. 3B illustrates exemplar features generated by the specialized denoisers of FIG. 1 for the exemplar region of FIG. 3A, according to various embodiments.

FIGS. 3A-3B illustrate an exemplar noisy image and denoised-image features generated by the specialized denoisers 152, according to various embodiments. As shown in FIG. 3A, a noisy image 300 depicts a wooden floor. FIG. 3B shows intermediate denoised image outputs 310, 312, and 314 generated by three specialized denoisers 152 given the noisy image 300 as input. As described, such intermediate denoised images 310, 312, and 314 can be input as additional denoised-image features into the generalizer 154.

As the specialized denoisers 152 are trained for particular noise parameters, such as a specific noise type (e.g., noise produced by a specific type of camera sensor) or a range of noise parameters (e.g., additive Gaussian noise with a specific magnitude), the quality of each intermediate denoised image 310, 312, and 314 will vary depending on the noise parameters associated with the input noisy image 300. As described, the generalizer 154 can be used to improve the final denoising quality by taking as input the intermediate denoised images 310, 312, and 314 as features in addition to the noisy image 300.

Figure 4:
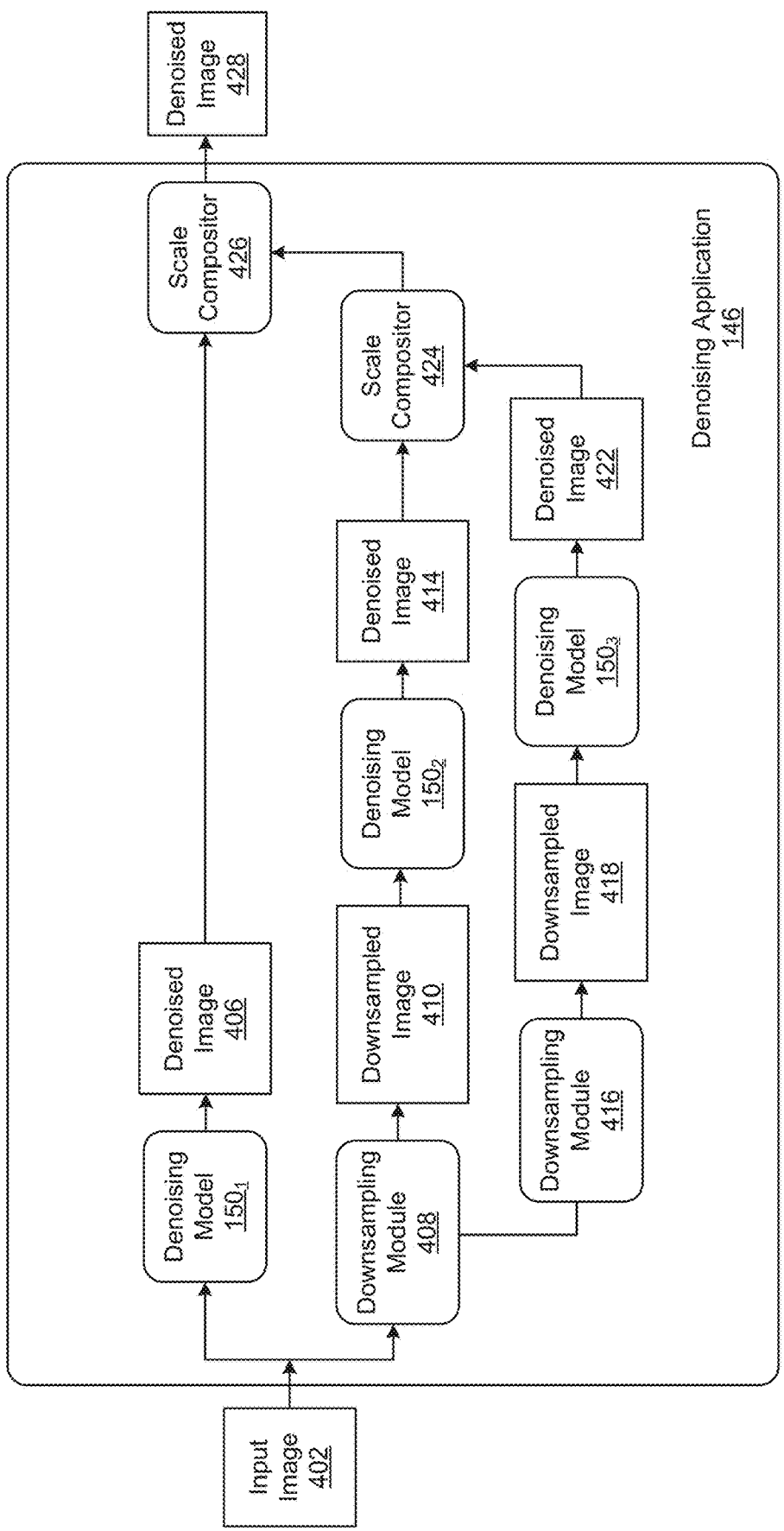
FIG. 4 is a more detailed illustration of the denoising application of FIG. 1, according to various embodiments.
Figure 5:
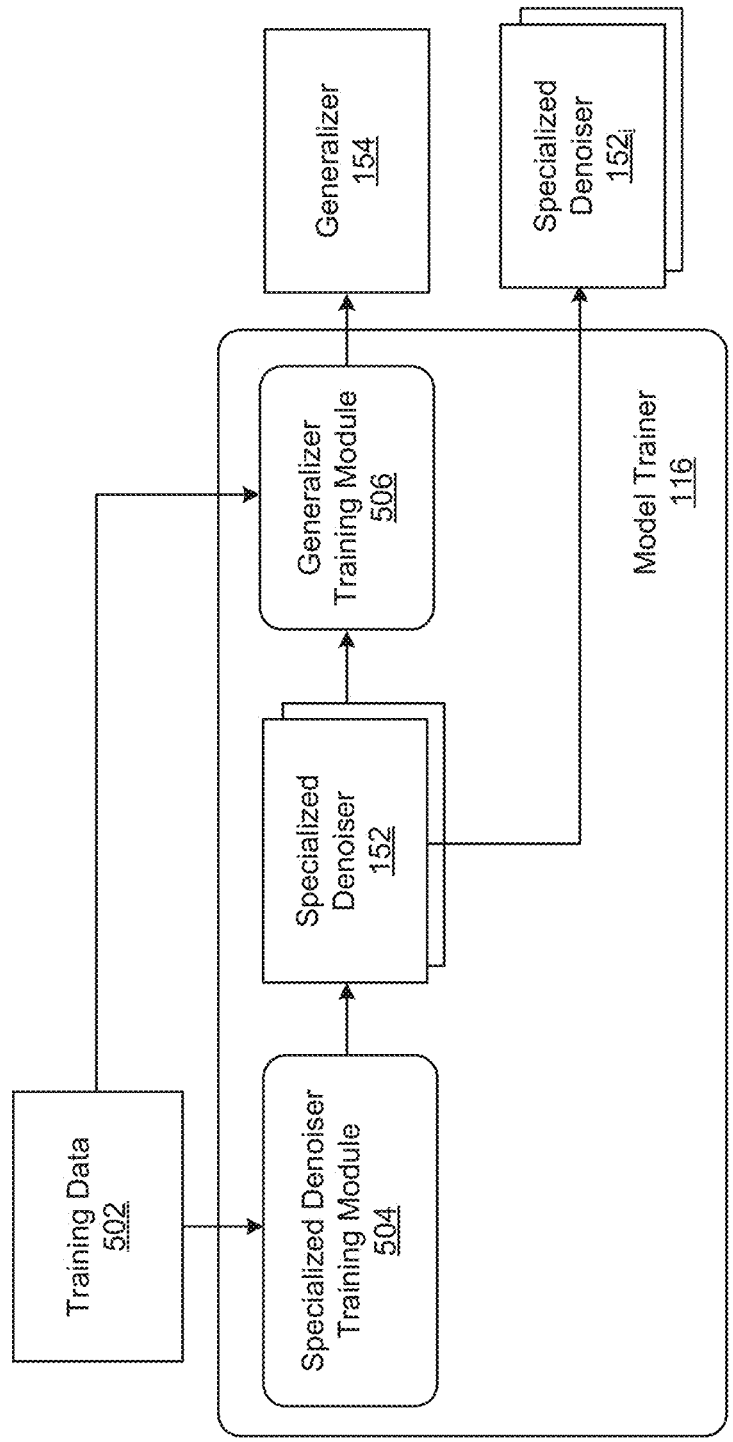
FIG. 5 is a more detailed illustration of the model trainer of FIG. 1, according to various embodiments.

FIG. 4 is a more detailed illustration of the denoising application 146 of FIG. 1, according to various embodiments. This illustration assumes that multi-scale denoising is performed to more effectively remove low-frequency components of noise. As described, such multi-scale denoising is optional, and, in other embodiments, the denoising application 146 may simply process a noisy image using the specialized denoisers 152 and then process the noisy image and intermediate denoised images generated by the specialized denoisers 152 using the generalizer 154 to obtain per-pixel denoising kernels that can be used to denoise the original, noisy image.

As shown in FIG. 4, downsampling modules 408 and 416 of the denoising application 146 downsample an input image 402 to generate downsampled images 410 and 418, respectively. In some embodiments, the input image 402 is uniformly downsampled to half the original size by the downsampling module 408, and then downsampled again to half the previously downsampled size (i.e., to a quarter of the original size) by the downsampling module 416. Although one input image 402 is shown for illustrative purposes, in some embodiments, the denoising application 146 may process multiple image frames from a video, such as a number of consecutive image frames before and after a given image frame that is being denoised.

As shown, the denoising application separately inputs the image 402 and the downsampled images 410 and 418 into the denoising models $150_{1-3}$, to obtain an intermediate denoised image 406, an intermediate denoised image 414, and an intermediate denoised image 422, respectively. Each of the denoising models 150$_{1-3}$ shown in FIG. 4 is the same as the denoising model 150, and processing of the image 402 and the downsampled images 410 and 418 using the denoising models 150$_{1-3}$ may either be performed in parallel or serially. As described, the generalizer 154 of the denoising model 150 outputs, for each pixel location, a respective kernel (e.g., a fixed-size 5×5 kernel). By determining such per-pixel kernels at different scales obtained via downsampling, the effective kernel size is increased. Doing so increases the perceptive field and helps remove low-frequency components of noise, which can be more challenging to remove and require larger filter kernels.

The intermediate denoised images 406, 414, and 422 are combined, starting from a combination of the coarsest denoised image 422 with the finer denoised image 414 using a scale compositor 424 and proceeding to a combination of an output of the scale compositor 424 with the finest denoised image 406 using a scale compositor 426. The output of the scale compositor 426 is a denoised image 428 that is output by the denoising application 145. In some embodiments, each of the scale compositors 424 and 426 takes as input a pair of coarse and fine scale images ($i^c$ and $i^f$), such as the intermediate denoised image 422 and the intermediate denoised image 414 or the output of the scale compositor 424 and the intermediate denoised image 406, as shown in FIG. 4. In such cases, each of the scale compositors 424 and 426 extracts, for each pixel p, a scalar weight $\alpha_p$ that is used to blend consecutive scales to generate a blended image as follows:

$$o_p^f = i_p^f - \alpha_p(UDi^f)_p + \alpha_p(Ui^c)_p, \quad (3)$$

where D denotes downsampling (e.g., a 2×2 downsampling) and U denotes upsampling (e.g., a 2×2 upsampling). Such a blending replaces low frequencies of the fine scale image $i^f$ with low frequencies obtained from the coarse scale image $i^c$ and produces the output $o^f$. The scalar weight $\alpha_p$ balances low frequencies from the finer and coarser scales. In some embodiments, the scalar weight $\alpha_p$ may be determined by taking the intermediate images produced by denoising two adjacent scales of a frame (or a sequence), namely a coarse-scale image $i^c$ and a fine-scale image $i^f$, and inputting those intermediate denoised images into a convolutional network that extracts a per-pixel scalar weight $\alpha_p$, which can then be used to blend the coarse- and fine-scale intermediate denoised images according to equation (3). Although described herein primarily with respect to successive scale compositors that each combine a pair of coarse and fine scale intermediate denoised images, in alternative embodiments a single scale compositor that combines intermediate denoised images at all of the different scales (e.g., the denoised images 406, 414, and 422) may be used.

FIG. 5 is a more detailed illustration of the model trainer 116 of FIG. 1, according to various embodiments. As shown, a two-step training procedure is employed in which the model trainer 116 uses training data 502 that includes a set of noisy images and corresponding clean images to first train the specialized denoisers 152. Then, the model trainer 116 uses the training data 502 and the trained specialized denoisers 152 to train the generalizer 154. As described, each of the specialized denoisers 152 is trained using noisy images having noise with a different set of noise parameters and corresponding clean images. Accordingly, the training of each of the specialized denoisers 152 at 504 will generally only use some of the noisy images (and corresponding clean images) in the training data 502 having noise with the particular set of noise parameters for which the specialized denoiser 152 is being trained. By contrast, a generalizer training module 506 can use a more diverse set of images to train the generalizer 154, such as all of the noisy images in the training data 502 and corresponding clean images, as well as intermediate denoised images output by the specialized denoisers 152 when given the noisy images from the training data 502. For example, Gaussian noise of random sigma ranging from 10 to 40 could be added to each image in a data set, and such noisy images as well as intermediate denoised images that are generated by the specialized denoiser 152 can be fed into the generalizer 154 during training.

Embodiments may utilize any technically feasible training techniques to train the specialized denoisers 152 and the generalizer 154. In some embodiments, both the generalizer 154 and the specialized denoisers 152 are trained using image patches of size 128×128, using mini-batch size 16 and the Adam optimizer with an initial learning rate of $10^{-4}$, as well as dataset specific schedulers to decay the learning rate during the course of training. In some embodiments, the training may use the mean absolute percentage error (MAPE) to assess the distance to a clean reference in the training data 502:

$$l(y, \hat{x}) = \frac{|y - \hat{x}|}{|y| + \epsilon}, \quad (4)$$

where $\hat{x}$ is the denoised image, y is the clean reference image, and $\epsilon = 10^{-3}$ is used to avoid division by zero. Other loss functions, such as $L_1$, root mean squared error (RMSE), and structural similarity (SSIM) may be used in alternative embodiments.

Figure 6A:
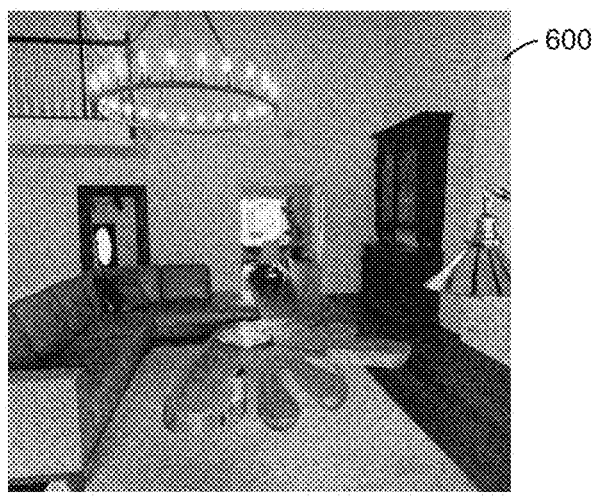
FIG. 6A illustrates another exemplar noisy image.
Figure 6B:
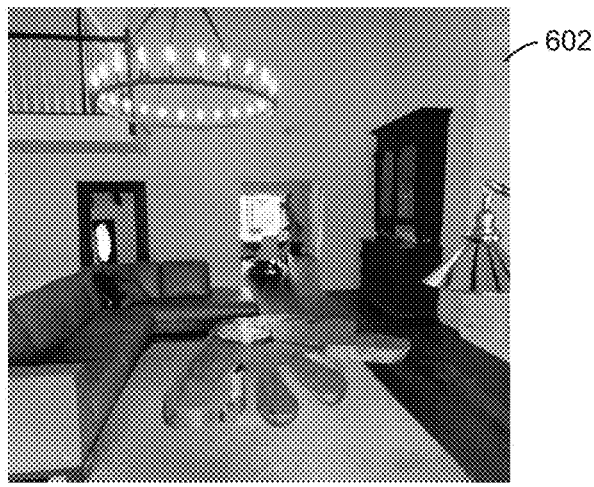
FIG. 6B illustrates a denoised image generated using a conventional blind denoiser, according to the prior art.
Figure 6C:
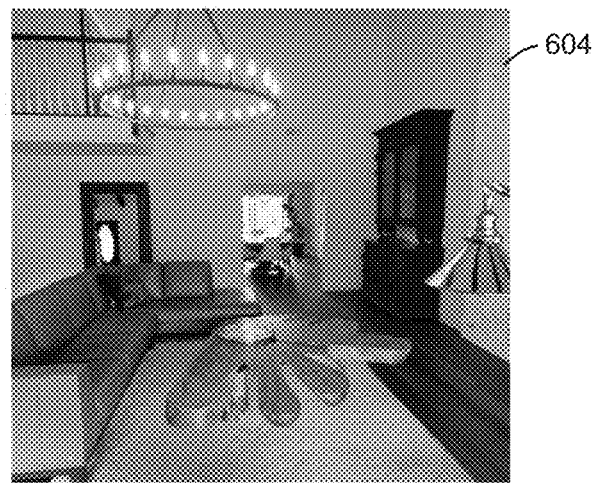
FIG. 6C illustrates a denoised image generated using the specialized denoisers and the generalizer of FIG. 1, according to various embodiments.

FIGS. 6A-6C illustrate an exemplar noisy image 600, a denoised image 602 generated using a conventional blind denoiser, and a denoised image 604 generated using the specialized denoisers 152 and the generalizer 154 of FIG. 1, according to various embodiments. Illustratively, the noisy image 600 is a live-action image. As described, live-action images can be denoised before visual effects are added and in the case of high dynamic range images that include a relatively large amount of noise, among other things. Although a live-action image is shown for illustrative purposes, techniques disclosed herein can also be applied to denoise rendered images, such as those generated using Monte Carlo rendering techniques. In contrast to rendered images, no additional information (e.g., albedo, surface normal, depth, etc.) beyond colors are typically available for live-action images that a denoiser can take advantage of.

As shown in FIG. 6C, the denoised image 604 generated from the noisy image 600 using the specialized denoisers 152 and the generalizer 154 has higher quality than the denoised image 602 generated using the conventional blind denoiser, shown in FIG. 6B. Quality may be measured as, e.g., the average distance from a corresponding clean image. Experience has shown that the specialized denoisers 152 and the generalizer 154 can generate denoised images that are sharper and more robust to varying levels of noise magnitudes compared to conventional blind denoisers. In addition, denoised images generated using the specialized denoisers 152 and the generalizer 154 can be at least as good as specialized denoisers for images having noise with noise parameters that the specialized denoisers were trained to denoise.

FIGS. 7A-7C illustrate another exemplar noisy image 700, a denoised image 710 generated using a conventional specialized denoiser, and a denoised image 720 generated using the specialized denoisers 152 and the generalizer 154 of FIG. 1, according to various embodiments. Zoomed-in views 706 and 708 of regions 702 and 704, respectively, within the noisy image are shown in FIG. 7A, Likewise, zoomed-in views 716 and 718 of regions 712 and 714, respectively, within the denoised image 710 are shown in FIG. 7B, and zoomed-in views 706 and 708 of regions 702 and 704, respectively, within the denoised image 720 are shown in FIG. 7C.

Similar to the noisy image 600, the noisy image 700 is shown as a live-action image, but may alternatively be a rendered image. As shown in FIG. 7C, the denoised image 720 generated from the noisy image 700 using the specialized denoisers 152 and the generalizer 154 has higher quality than the denoised image 710 generated using the conventional specialized denoiser, shown in FIG. 7B. In generating the denoised image 710, a specialized U-Net was used as the conventional specialized denoiser. In generating the denoised image 720, five U-Nets and a KPCN were used as the specialized denoisers 152 and the generalizer 154, respectively.

Figure 8:
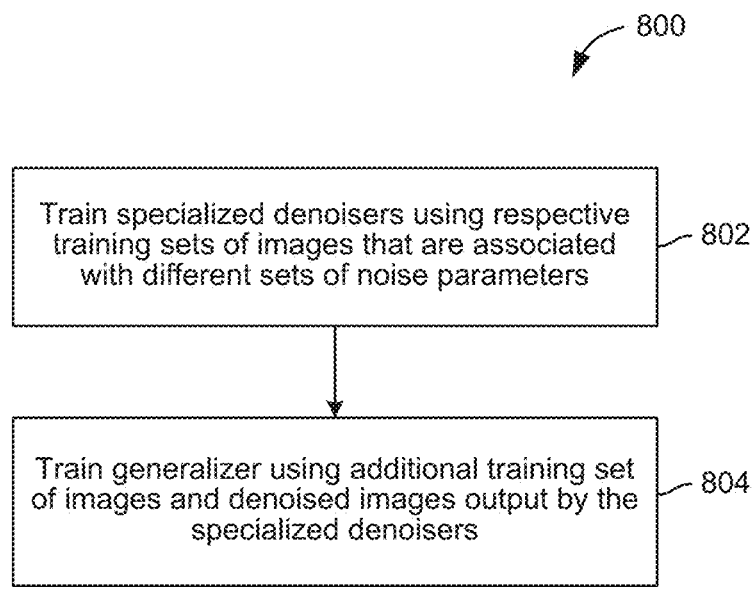
FIG. 8 sets forth a flow diagram of method steps for training multiple specialized denoisers and a generalizer, according to various embodiments.

FIG. 8 sets forth a flow diagram of method steps for training the specialized denoisers 152 and the generalizer 154, according to various embodiments. Although the method steps are described in conjunction with the system of FIG. 1, persons of ordinary skill in the art will understand that any system configured to perform the method steps, in any order, is within the scope of the present disclosure.

As shown, a method 800 begins at step 802, where the model trainer 116 trains the specialized denoisers 152 using respective training sets of images that are associated with different sets of noise parameters. As described, each of the specialized denoisers 152 is trained to demise images associated with a specific range of noise parameters.

At step 804, the model trainer 116 trains the generalizer 154 using an additional training set of images and denoised images output by the specialized denoisers 152 after the additional set of images is input into the trained specialized denoisers 152. As described, the generalizer 154 is trained to take as inputs a noisy image and intermediate denoised images generated by the specialized denoisers 152 given the same noisy image, and to output per-pixel denoising kernels. In some embodiments, the generalizer 154 is trained using a more diverse set of images than the sets of images used to train each of the specialized denoisers 152 individually.

Figure 9:
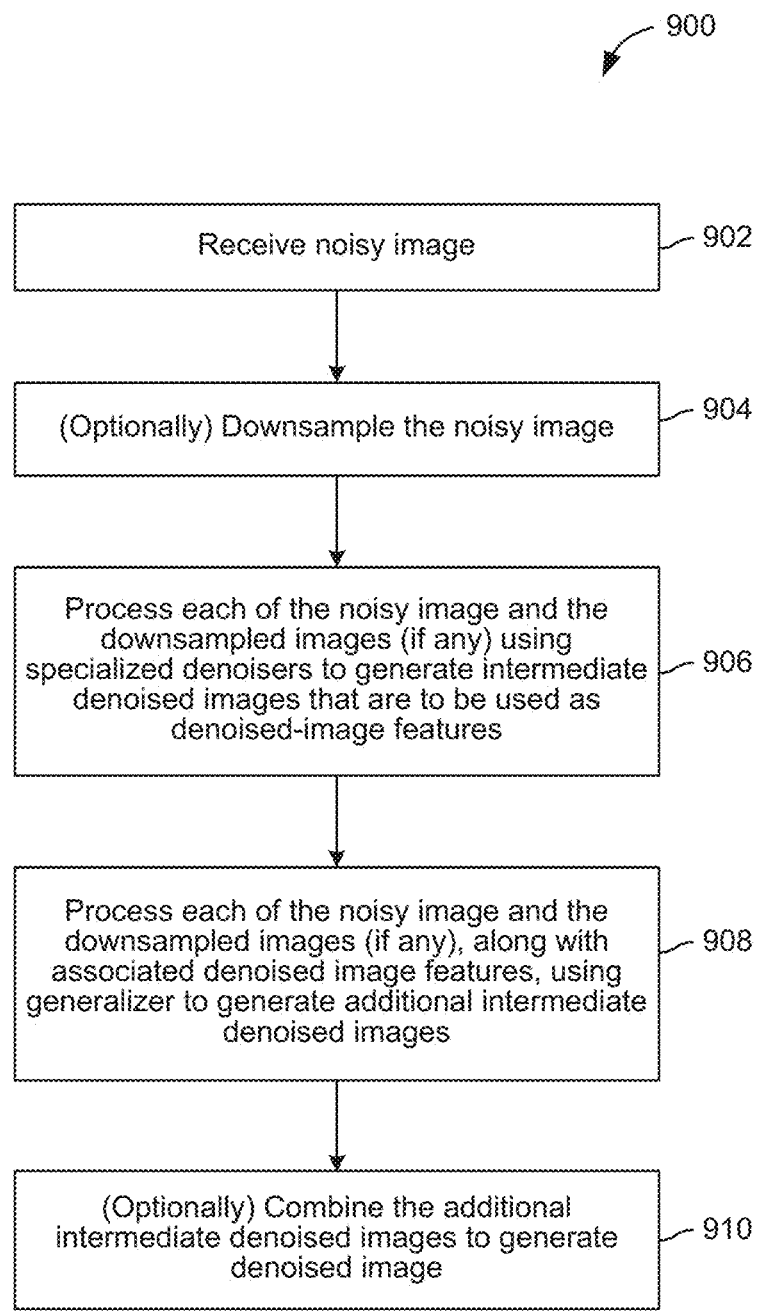
FIG. 9 sets forth a flow diagram of method steps for denoising an image, according to various embodiments.

FIG. 9 sets forth a flow diagram of method steps for denoising an image, according to various embodiments. Although the method steps are described in conjunction with the system of FIG. 1, persons of ordinary skill in the art will understand that any system configured to perform the method steps, in any order, is within the scope of the present disclosure.

As shown, a method 900 begins at step 902, where the denoising application 146 receives a noisy image. The noisy image may be, e.g., a live-action image or a rendered image. Further, the noisy image may either be a stand-alone image or an image frame within a video. In some embodiments, the denoising application 146 may receive and process other images in addition to the noisy image, such as a number of consecutive image frames before and after the noisy image, as discussed above in conjunction with FIGS. 2 and 4.

At step 904, the denoising application 146 optionally downsamples the noisy image. As described, downsampling may be performed in the multi-scale case to increase the perceptive field and remove low-frequency components of noise. In some embodiments, the noisy image may be uniformly downsampled to half the original size during each of one or more downsampling operations.

At step 906, the denoising application 146 processes each of the noisy image and the downsampled images (if any) using the specialized denoisers 152 to generate intermediate denoised images that are to be used as denoised-image features. As described, each of the specialized denoisers 152 is trained to denoise images associated with a specific range of noise parameters. Intermediate denoised images output by the specialized denoisers 152 are then input as additional features, along with the original noisy image, into the generalizer 154.

At step 908, the denoising application 146 processes each of the noisy image and the downsampled images (if any), along with associated denoised-image features, using the generalizer 154 to generate additional intermediate denoised images. As described, the generalizer 154 is a kernel predicting network, such as a KPCN, in some embodiments. In such cases, the denoising application 146 processes each of the noisy image and the downsampled images (if any), along with associated denoised-image features, using the kernel predicting network to obtain respective per-pixel denoising kernels. Then, the denoising application 146 applies the respective denoising kernels to the noisy image and the downsampled images (if any) to generate the additional intermediate denoised images at step 908. As described, other embodiments may employ a second denoiser other than the generalizer 154 that is trained and applied to denoise images given the images themselves, as well intermediate denoised images output by the specialized denoisers 152, as input If the optional downsampling at step 904 is not performed, then the denoised image generated by processing the noisy image at step 908 is the final denoised image that is output by the denoising application 146. Otherwise, the method 900 proceeds to step 910.

At step 910, the denoising application 146 optionally combines the intermediate denoised images to generate a denoised image. This step assumes that the denoising application 146 downsampled the noisy image at step 904. As described, in some embodiments, the denoising application 146 combines the intermediate denoised images using scale compositors, beginning with a coarsest intermediate denoised image and proceeding to finer intermediate denoised images.

In sum, techniques are disclosed for training and applying a denoising model that is capable of removing noise from images where attributes of the noise are not known a priori. The denoising model includes multiple specialized denoisers and a generalizer, each of which is a machine learning model. The specialized denoisers are trained to denoise images associated with specific ranges of noise parameters. The generalizer is trained to generate per-pixel denoising kernels for denoising images associated with arbitrary noise parameters using outputs of the trained specialized denoisers. Subsequent to training, a noisy image, such as a live-action image or a rendered image, can be denoised by inputting the noisy image into the specialized denoisers to obtain intermediate denoised images that are then input, along with the noisy image, into the generalizer to obtain per-pixel denoising kernels, which can be normalized and applied to denoise the noisy image.

At least one technical advantage of the disclosed techniques relative to the prior art is that the disclosed techniques bypass the traditional tradeoff between the denoising quality of specialized denoisers and the generalizability and robustness of blind denoisers. In that regard, the disclosed techniques combine the performance of specialized denoisers with the generalizing capabilities of blind denoisers. Experience has shown that the disclosed techniques can achieve better denoising quality than conventional specialized denoisers when applied to images having noise with arbitrary noise parameters, such as different noise magnitudes. The disclosed techniques also can achieve better overall denoising quality than conventional blind denoisers. In addition, the disclosed techniques can denoise images more quickly than many conventional denoisers. These technical advantages represent one or more technological improvements over prior art approaches.

Any and all combinations of any of the claim elements recited in any of the claims and/or any elements described in this application, in any fashion, fall within the contemplated scope of the present invention and protection.

1. In some embodiments, a computer-implemented method for denoising an image comprises processing the image using a plurality of first denoisers to generate a plurality of first denoised images, wherein each first denoiser is trained to denoise images associated with at least one noise parameter, and processing the image and the plurality of first denoised images using a second denoiser to generate a second denoised image.

2. The computer-implemented method of clause 1, further comprising downsampling the image to generate a downsampled image, processing the downsampled image using the plurality of first denoisers to generate a plurality of third denoised images, processing the downsampled image and the plurality of third denoised images using the second denoiser to generate a fourth denoised image, and combining the second denoised image and the fourth denoised image to produce a first blended image.

3, The computer-implemented method of clauses 1 or 2, wherein the second denoised image and the fourth denoised image are combined using a scale compositor that receives the second denoised image and the fourth denoised image as input and outputs the first blended image.

4. The computer-implemented method of any of clauses 1-3, wherein the second denoiser comprises a kernel predicting convolutional network (KPCN), and processing the image and the plurality of first denoised images using the second denoiser comprises inputting the image and the plurality of first denoised images into the second denoiser to determine per-pixel kernels, normalizing the per-pixel kernels to generate normalized kernels, and denoising the image using the normalized kernels to generate the second denoised image.

5. The computer-implemented method of any of clauses 1-4, wherein each first denoiser included in the plurality of first denoisers comprises a denoising convolutional neural network (DnCNN).

6. The computer-implemented method of any of clauses 1-5, wherein each first denoiser included in the plurality of first denoisers comprises a U-net architecture network.

7, The computer-implemented method of any of clauses 1-6, wherein the at least one noise parameter indicates at least one of a type of camera sensor or a range of noise magnitudes.

8. The computer-implemented method of any of clauses 1-7, wherein the image is captured by a camera.

9. The computer-implemented method of any of clauses 1-8, wherein the image comprises a rendered image.

10. In some embodiments, a computer-implemented method for training denoisers comprises training each first denoiser included in a plurality of first denoisers using a respective set of images associated with at least one noise parameter and ground truth images corresponding to images included in the respective set of images, and training a second denoiser using an additional set of images, ground truth images corresponding to images included in the additional set of images, and a plurality of denoised images, wherein the plurality of denoised images is generated by processing the additional set of images using the plurality of first denoisers.

11. The computer-implemented method of clause 10, wherein each first denoiser included in the plurality of first denoisers and the second denoiser is trained using a mean absolute percentage error loss function.

12. The computer-implemented method of clauses 10 or 11, wherein the at least one noise parameter indicates at least one of a type of camera sensor or a range of noise magnitudes.

13. The computer-implemented method of any of clauses 10-12, wherein each first denoiser included in the plurality of first denoisers and the second denoiser receives input comprising a single image to be denoised.

14, The computer-implemented method of any of clauses 10-13, wherein each first denoiser included in the plurality of first denoisers and the second denoiser receives input comprising an image frame to be denoised and a plurality of image frames before and after the image frame in a video.

15. The computer-implemented method of any of clauses 10-14, wherein the second denoiser comprises a kernel predicting convolutional network (KPCN) that takes as input an image and denoised images generated by processing the image using the plurality of first denoisers.

16. The computer-implemented method of any of clauses 10-15, wherein each first denoiser included in the plurality of first denoisers comprises one of a denoising convolutional neural network (DnCNN) or a U-net architecture network.

17. The computer-implemented method of any of clauses 10-16, wherein each image of the respective set of images and the additional set of images comprises a rendered image or an image captured by a camera.

18. In some embodiments, a computer-readable storage medium includes instructions that, when executed by a processing unit, cause the processing unit to perform steps for denoising an image, the steps comprising processing the image using a plurality of first denoisers to generate a plurality of first denoised images, wherein each first denoiser is trained to denoise images associated with at least one noise parameter, and processing the image and the plurality of first denoised images using a second denoiser to generate a second denoised image.

19. The computer-readable storage medium of clause 18, the steps further comprising downsampling the image to generate a downsampled image, processing the downsampled image using the plurality of first denoisers to generate a plurality of third denoised images, processing the downsampled image and the plurality of third denoised images using the second denoiser to generate a fourth denoised image, and combining the second denoised image and the fourth denoised image to produce a first blended image.

20. The computer-readable storage medium of clauses 18 or 19, wherein the second denoiser comprises a kernel predicting convolutional network (KPCN), and processing the image and the plurality of first denoised images using the second denoiser comprises inputting the image and the plurality of first denoised images into the second denoiser to determine per-pixel kernels, normalizing the per-pixel kernels to generate normalized kernels, and denoising the image using the normalized kernels to generate the second denoised image.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system," Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for denoising an image, the method comprising:
   processing the image using a plurality of first denoisers to generate a plurality of first denoised images, wherein each first denoiser included in the plurality of first denoisers is trained to denoise a set of images associated with a different set of noise parameters;
   processing the image and the plurality of first denoised images using a second denoiser, into which the image and the plurality of first denoised images are input, to generate a second denoised image, wherein the second denoiser is trained to denoise an additional set of images that includes one or more images from each set of images used to train a corresponding first denoiser included in the plurality of first denoisers;
   downsampling the image to generate a downsampled image;
   processing the downsampled image using the plurality of first denoisers to generate a plurality of third denoised images;
   processing the downsampled image and the plurality of third denoised images using the second denoiser, into which the downsampled image and the plurality of third denoised images are input, to generate a fourth denoised image; and
   combining the second denoised image and the fourth denoised image to produce a first blended image, wherein the second denoised image and the fourth denoised image are combined using a scale compositor that receives the second denoised image and the fourth denoised image as input and outputs the first blended image.

2. The computer-implemented method of claim 1, wherein the second denoiser comprises a kernel predicting convolutional network (KPCN), and processing the image and the plurality of first denoised images using the second denoiser comprises:
   inputting the image and the plurality of first denoised images into the second denoiser to determine per-pixel kernels;
   normalizing the per-pixel kernels to generate normalized kernels; and
   denoising the image using the normalized kernels to generate the second denoised image.

3. The computer-implemented method of claim 1, wherein each first denoiser included in the plurality of first denoisers comprises a denoising convolutional neural network (DnCNN), and wherein the DnCNN includes a plurality of convolutional layers, a batch normalization, and a rectified linear unit activation.

4. The computer-implemented method of claim 1, wherein each first denoiser included in the plurality of first denoisers comprises a U-net architecture network.

5. The computer-implemented method of claim 1, wherein at least one noise parameter included in the different sets of noise parameters associated with the sets of images used to train the plurality of first denoisers indicates a range of noise magnitudes.

6. The computer-implemented method of claim 1, wherein at least one noise parameter included in the different sets of noise parameters associated with the sets of images used to train the plurality of first denoisers indicates a type of camera sensor.

7. The computer-implemented method of claim 1, wherein the image comprises a rendered image.

8. A computer-implemented method for training denoisers, the method comprising:
   training each first denoiser included in a plurality of first denoisers using a respective set of images associated with a different set of noise parameters and ground truth images corresponding to images included in the respective set of images;
   training a second denoiser using an additional set of images, ground truth images corresponding to images included in the additional set of images, and a plurality of denoised images, wherein the plurality of denoised images is generated by processing the additional set of images using the plurality of first denoisers, and wherein the additional set of images includes one or more images from each set of images used to train a corresponding first denoiser included in the plurality of first denoisers;
   processing an image using the plurality of first denoisers to generate a plurality of first denoised images;
   processing the image and the plurality of first denoised images using the second denoiser, into which the image and the plurality of first denoised images are input, to generate a second denoised image;
   downsampling the image to generate a downsampled image;
   processing the downsampled image using the plurality of first denoisers to generate a plurality of third denoised images;
   processing the downsampled image and the plurality of third denoised images using the second denoiser, into which the downsampled image and the plurality of third denoised images are input, to generate a fourth denoised image; and
   combining the second denoised image and the fourth denoised image to produce a first blended image, wherein the second denoised image and the fourth denoised image are combined using a scale compositor that receives the second denoised image and the fourth denoised image as input and outputs the first blended image.

9. The computer-implemented method of claim 8, wherein each first denoiser included in the plurality of first denoisers and the second denoiser are trained using a mean absolute percentage error loss function.

10. The computer-implemented method of claim 8, wherein at least one noise parameter included in the different sets of noise parameters associated with the sets of images used to train the plurality of first denoisers indicates at least one of a type of camera sensor or a range of noise magnitudes.

11. The computer-implemented method of claim 8, wherein each first denoiser included in the plurality of first denoisers and the second denoiser receive input comprising a single image to be denoised.

12. The computer-implemented method of claim 8, wherein each first denoiser included in the plurality of first denoisers and the second denoiser receive input comprising an image frame to be denoised and a plurality of image frames before and after the image frame in a video.

13. The computer-implemented method of claim 8, wherein the second denoiser comprises a kernel predicting convolutional network (KPCN).

14. The computer-implemented method of claim 8, wherein each first denoiser included in the plurality of first denoisers comprises one of a denoising convolutional neural network (DnCNN) or a U-net architecture network.

15. The computer-implemented method of claim 8, wherein the additional set of images is associated with a combination of the different sets of noise parameters included in the sets of images used to train the plurality of first denoisers.

16. A non-transitory computer-readable storage medium including instructions that, when executed by a processing unit, cause the processing unit to perform steps for denoising an image, the steps comprising:
   processing the image using a plurality of first denoisers to generate a plurality of first denoised images, wherein each first denoiser is trained to denoise a set of images associated with a different set of noise parameters;
   processing the image and the plurality of first denoised images using a second denoiser, into which the image and the plurality of first denoised images are input, to generate a second denoised image, wherein the second denoiser is trained to denoise an additional set of images that includes one or more images from each set of images used to train a corresponding first denoiser included in the plurality of first denoisers;
   downsampling the image to generate a downsampled image;
   processing the downsampled image using the plurality of first denoisers to generate a plurality of third denoised images;
   processing the downsampled image and the plurality of third denoised images using the second denoiser, into which the downsampled image and the plurality of third denoised images are input, to generate a fourth denoised image; and
   combining the second denoised image and the fourth denoised image to produce a first blended image, wherein the second denoised image and the fourth denoised image are combined using a scale compositor that receives the second denoised image and the fourth denoised image as input and outputs the first blended image.

17. The computer-readable storage medium of claim 16, wherein the second denoiser comprises a kernel predicting convolutional network (KPCN), and processing the image and the plurality of first denoised images using the second denoiser comprises:
   inputting the image and the plurality of first denoised images into the second denoiser to determine per-pixel kernels;

normalizing the per-pixel kernels to generate normalized kernels; and denoising the image using the normalized kernels to generate the second denoised image.

* * * * *

UNITED STATES PATENT AND TRADEMARK OFFICE
CERTIFICATE OF CORRECTION

| | | |
|---|---|---|
| PATENT NO. | : 12,141,945 B2 | Page 1 of 1 |
| APPLICATION NO. | : 16/795486 | |
| DATED | : November 12, 2024 | |
| INVENTOR(S) | : Zhilin Cai et al. | |

It is certified that error appears in the above-identified patent and that said Letters Patent is hereby corrected as shown below:

In the Specification

In Column 7, Line 39, delete "$\hat{x}=(d\{x, f\}; \hat{\theta})$," and insert --$\hat{x}=d(\{x, f\}; \hat{\theta})$,--.

Signed and Sealed this
Fourteenth Day of January, 2025

Derrick Brent
*Acting Director of the United States Patent and Trademark Office*